United States Patent [19]

Nagamatsu

[11] Patent Number: 5,056,651
[45] Date of Patent: Oct. 15, 1991

[54] FLIGHT FOR COLLECTING SLUDGE BY SWEEPING AND ROLLER SHOE FIXED THERETO

[75] Inventor: Hiromitsu Nagamatsu, Kumagaya, Japan

[73] Assignee: Hitachi Metals, Ltd., Tokyo, Japan

[21] Appl. No.: 590,719

[22] Filed: Oct. 1, 1990

[30] Foreign Application Priority Data

Apr. 19, 1990 [JP] Japan .................................. 2-41888

[51] Int. Cl.$^5$ .............................................. B65G 19/00
[52] U.S. Cl. .................................. 198/725; 198/734; 198/731
[58] Field of Search ............... 198/725, 728, 731, 734, 198/838, 845

[56] References Cited

U.S. PATENT DOCUMENTS

| | | | |
|---|---|---|---|
| 3,124,239 | 3/1964 | Kornylak | 198/838 |
| 4,815,586 | 3/1989 | Heising | 198/734 X |

FOREIGN PATENT DOCUMENTS

| | | | |
|---|---|---|---|
| 0546916 | 10/1957 | Canada | 198/731 |
| 2631801 | 2/1977 | Fed. Rep. of Germany | 198/734 |
| 0655420 | 4/1929 | France | 198/731 |
| 0048314 | 5/1981 | Japan | 198/734 |
| 0031805 | 2/1983 | Japan | 198/731 |
| 59-162912 | 9/1984 | Japan . | |
| 63-14641 | 3/1988 | Japan . | |

*Primary Examiner*—D. Glenn Dayoan
*Assistant Examiner*—James R. Bidwell
*Attorney, Agent, or Firm*—Finnegan, Henderson, Farabow, Garrett & Dunner

[57] ABSTRACT

A flight for collecting sludge by sweeping comprises a roller shoe, comprising (a) a frame having a substantially U-shaped cross section and having a pair of side plates, (b) a shaft having a diameter-enlarged portion at one end and a threaded portion at the other end, and fixed to the side plates, and (c) a roller rotatably supported by the shaft between the side plates, wherein the frame is constituted by an injection-molded synthetic resin, and the roller is made of a synthetic resin.

2 Claims, 4 Drawing Sheets

FLIGHT FOR COLLECTING SLUDGE BY SWEEPING AND ROLLER SHOE FIXED THERETO

BACKGROUND OF THE INVENTION

The present invention relates to a flight for collecting sludge by sweeping, which is used in a sludge-collecting apparatus operated in sewage treatment facilities, etc., and a roller shoe for such a flight.

As shown in FIG. 7, the sludge-collecting apparatus comprises a plurality of sprocket wheels 12a, 12b, ... disposed on side walls of a sedimentation pond 11 on both upstream and downstream sides thereof, and a pair of endless chains 13 each movable around the sprocket wheels 12a, 12b, ... along a bottom and a surface of the sedimentation pond 11. Each endless chain 13 is provided with flights 14 at an equal interval. A first metal rail 15 is disposed on the bottom of the sedimentation pond 11 between the sprocket wheels 12a, 12a and a second metal rail 16 is disposed near the surface of the sedimentation pond 11 between the sprocket wheels 12b, 12b. One of the sprocket wheels 12b rotatably engages a sprocket wheel connected to a driving means (not shown) via a chain.

Each flight 14 attached to the endless chain 13 slides along the rail 15, 16. As shown in FIG. 8, the flight 14 is provided with shoes 17, 18 which slide along the rails 15, 16 to support the flight 14. While moving along the bottom of the sedimentation pond 11, each flight 14 collects the sludge sedimented at the bottom of the sedimentation pond 11.

However, since most sewage is corrosive and contains sands, metal wastes, hard particles, etc., the shoes 17, 18 are likely to be corroded and abraded by contact with the rails 15, 17. Therefore, the flights have a short service life.

To overcome the above problem, Japanese Patent Laid-Open No. 59-162912 discloses, as shown in FIGS. 5 and 6, a flight for collecting sludge by sweeping which comprises a roller shoe 5 constituted by a U-shaped frame 51, a shaft 53 fixed to the U-shaped frame 51 by a nut 54 and a roller 52 rotatably supported by the shaft 53. The roller shoe 5 is mounted to the flight by threading means. In this flight, the roller 52 is made of a synthetic resin. With respect to the U-shaped frame 51, this reference is silent about its material, but it is usually made of stainless steel.

Recently, the materials of the flight are changing from wood to synthetic resins such as fiber-reinforced plastics (FRP). The flight made of FRP usually has a substantially F-shaped cross section or a substantially U-shaped cross section to reduce its weight. The roller shoe is mounted to such flight at its notch, and fixed together by threading means.

However, since conventional roller shoes are made of stainless steel, a separate means made of stainless steel for fixing a roller shaft by threading should be welded to a U-shaped frame. As a result, a shaft-fixing means projects outward at a substantial height. Accordingly, the notch of the flight should also be large enough to accommodate the projected portion of the U-shaped frame, resulting in a large amount of uncollected sludge remaining after sweeping.

OBJECT AND SUMMARY OF THE INVENTION

An object of the present invention is to provide a flight for collecting sludge by sweeping which can collect sludge sedimented at a bottom of a sedimentation pond efficiently.

Another object of the present invention is to provide a roller shoe for a flight, which does not have a large projection in its U-shaped frame, thereby avoiding the flight from having a large notch which leads to insufficient collection of sludge.

Thus, the flight according to the present invention comprises:

(a) a frame having a substantially U-shaped cross section, which has a pair of side plates, one side plate being provided with a first aperture, a first annular outward projection around the first aperture and a first center recess inside the first annular outward projection, and the other side plate being provided with a second aperture, a second annular outward projection around the second aperture and a second center recess inside the second annular outward projection;

(b) a shaft having a diameter-enlarged portion at one end and a threaded portion at the other end, the diameter-enlarged portion engaging the first center recess without projecting from the first annular outward projection such that the rotation of the shaft is prevented, and the threaded portion projecting from the second aperture and being fastened to a threading means inside the second center recess via the side plate, so that the shaft is fixed to the frame; and (c) a roller rotatably supported by the shaft between the side plates, wherein the flight is made of fiber-reinforced plastics, the frame is constituted by an injection-molded synthetic resin, and the roller is made of a synthetic resin.

The roller shoe for a flight according to the present invention comprises;

(a) a frame having a substantially U-shaped cross section, which has a pair of side plates, one side plate being provided with a first aperture, a first annular outward projection around the first aperture and a first center recess inside the first annular outward projection, and the other side plate being provided with a second aperture, a second annular outward projection around the second aperture and a second center recess inside the second annular outward projection;

(b) a shaft having a diameter-enlarged portion at one end and a threaded portion at the other end, the diameter-enlarged portion engaging the first center recess without projecting from the first annular outward projection such that the rotation of the shaft is prevented, and the threaded portion projecting from the second aperture and being fastened to a threading means inside the second center recess via the side plate, so that the shaft is fixed to the frame; and (c) a roller rotatably supported by the shaft between the side plates, wherein the frame is constituted by an injection-molded synthetic resin, and the roller is made of a synthetic resin. ,

DETAILED DESCRIPTION OF THE INVENTION

Figure 1:
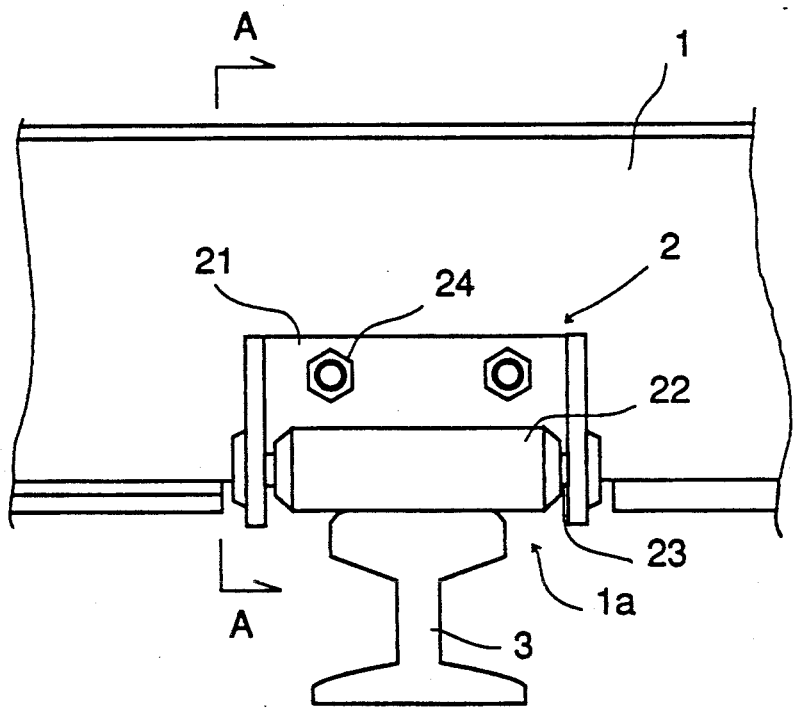
FIG. 1 is a front view showing a flight according to one embodiment of the present invention.
Figure 2:
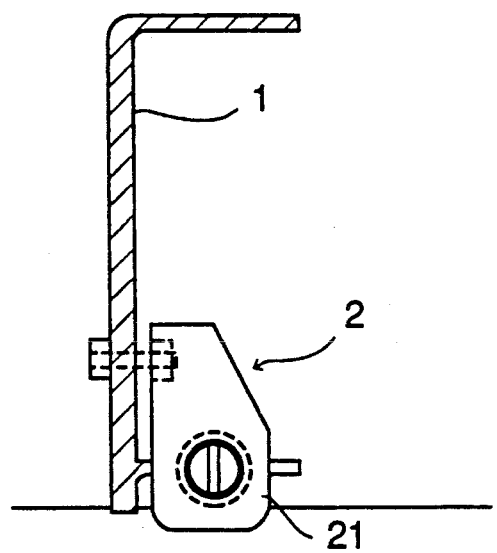
FIG. 2 is a cross-sectional view taken along the line A—A in FIG. 1.

Referring to FIGS. 1 and 2, a flight 1 having a substantially F-shaped cross section according to the present invention has a notch 1a in its lower flange, to which a roller shoe 2 is mounted. The roller shoe 2 comprises a U-shaped frame 21 to which a shaft 23 for rotatably supporting a roller 22 is fixed. The U-shaped frame 21 is fixed to the flight 1 by threading means 24.

Figure 3:
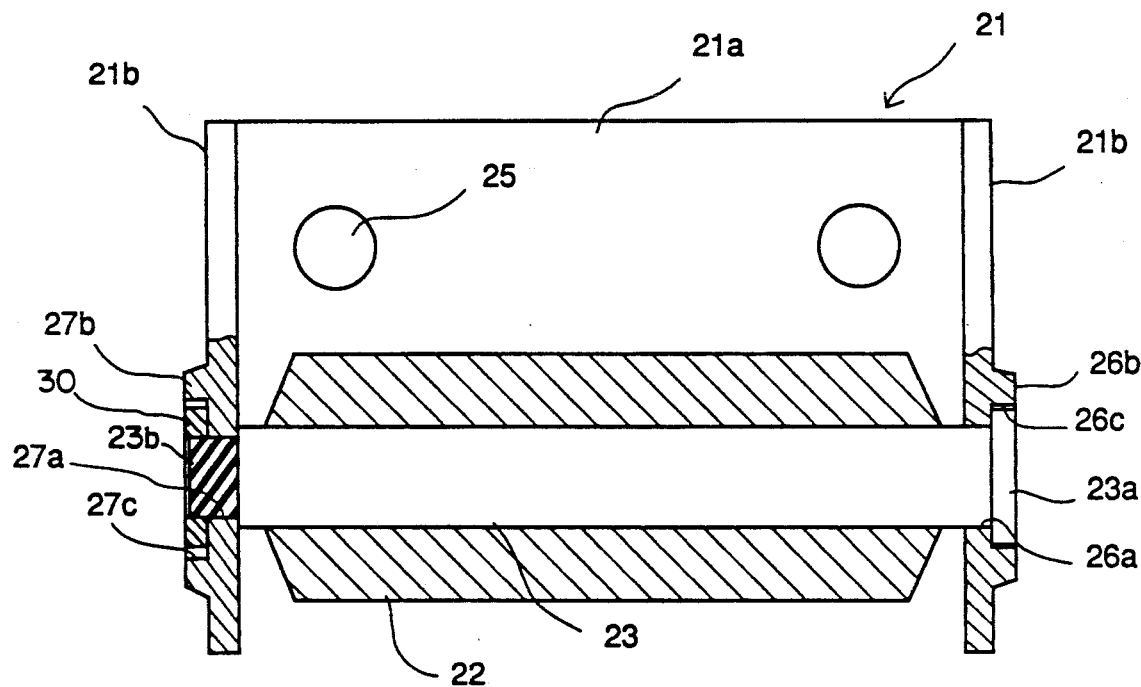
FIG. 3 is a partial cross-sectional view showing a roller shoe of the flight according to one embodiment of the present invention.
Figure 4:
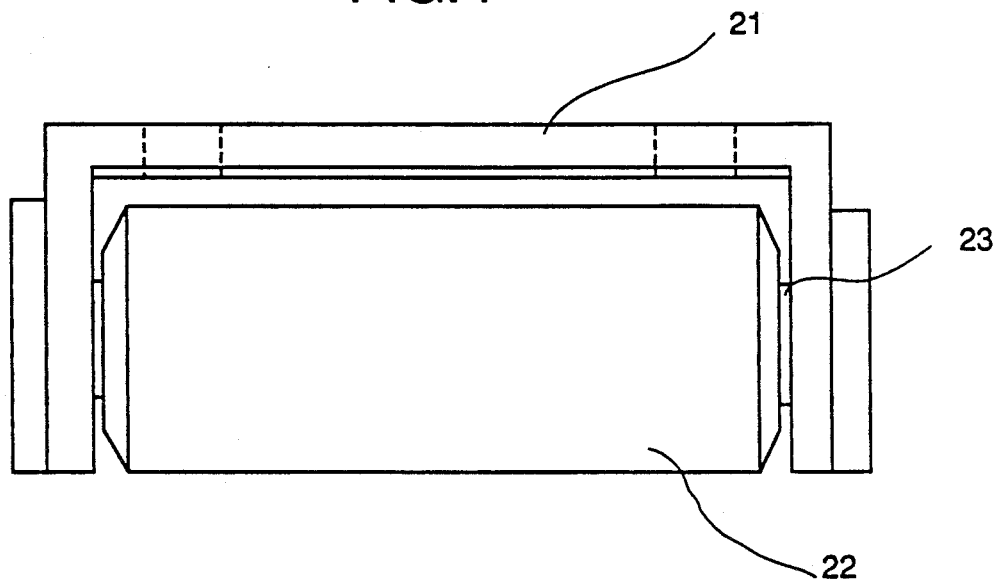
FIG. 4 is a front view showing the roller shoe of FIG. 3.
Figure 5:
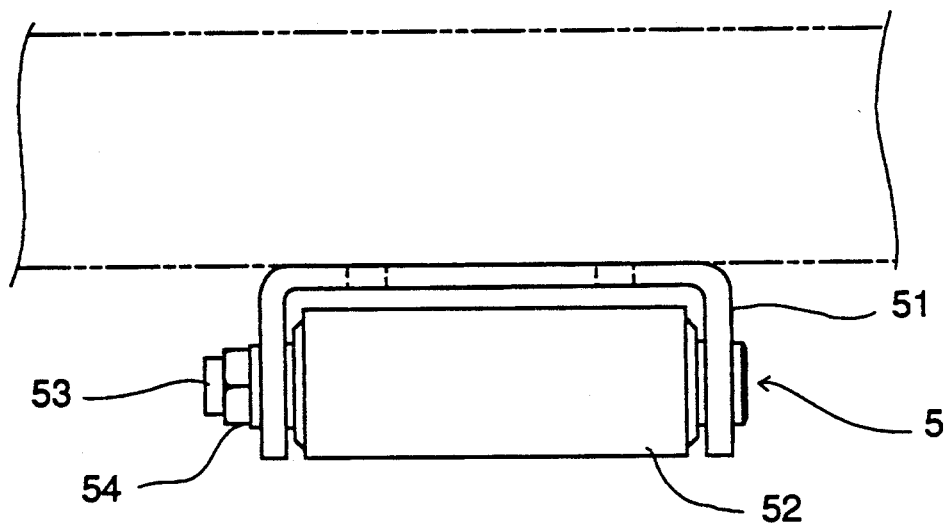
FIG. 5 is a front view showing a conventional roller shoe.
Figure 6:
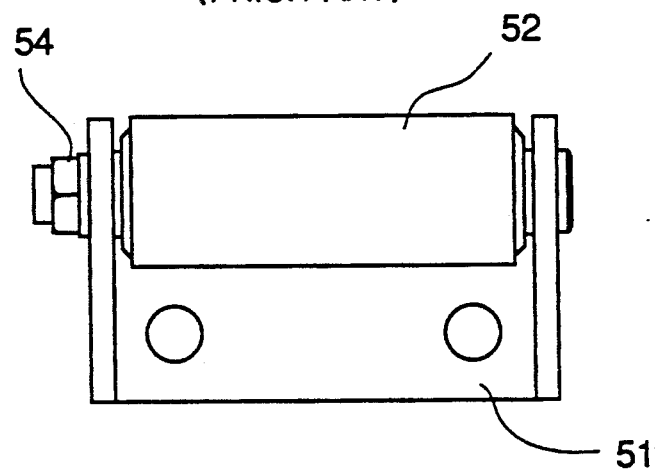
FIG. 6 is a bottom view showing the conventional roller shoe of FIG. 5.
Figure 7:
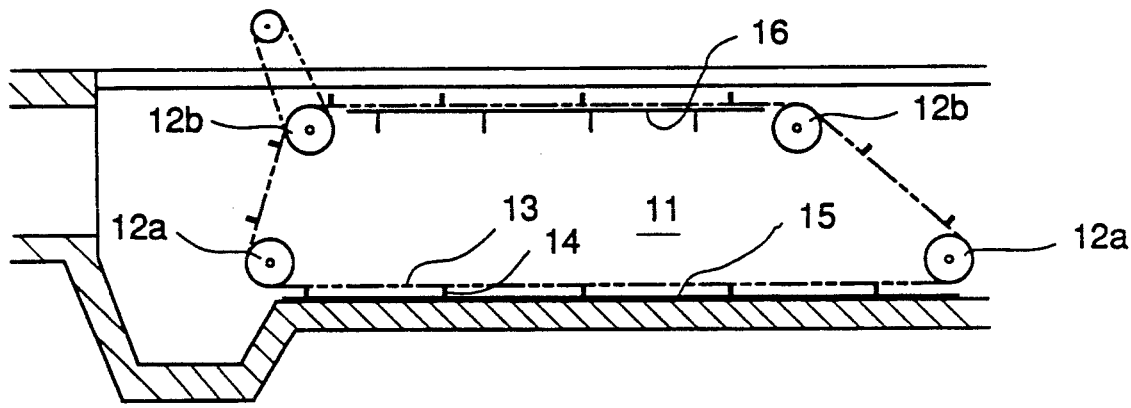
FIG. 7 is a schematic cross-sectional view showing a usual sludge-collecting apparatus.
Figure 8:
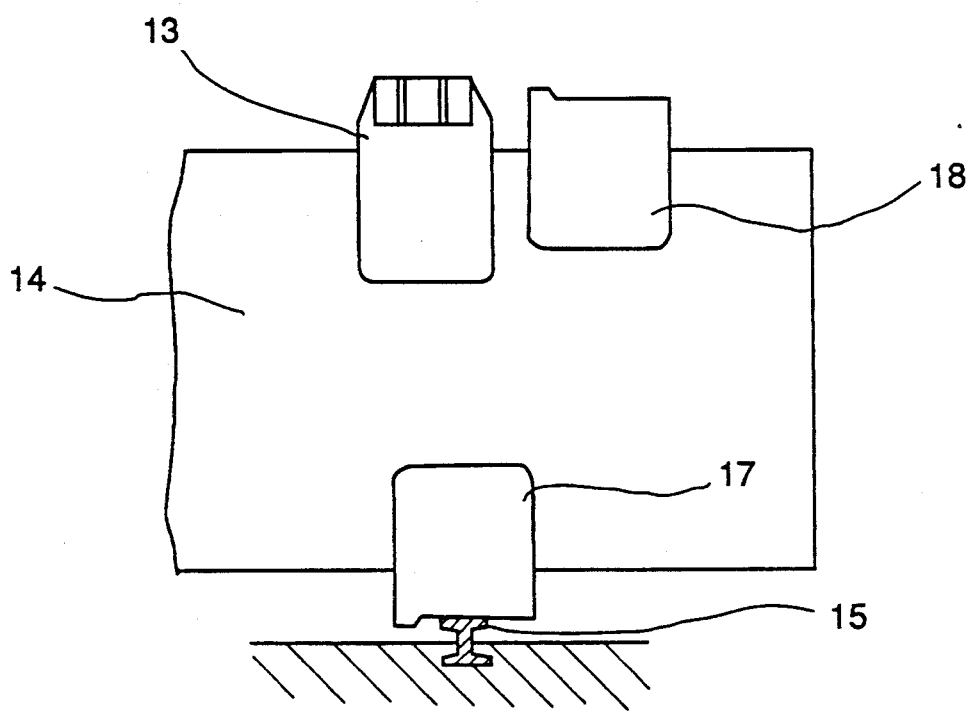
FIG. 8 is a front view showing a conventional flight for collecting sludge by sweeping.

As shown in FIG. 3, the U-shaped frame 21 comprises a bottom plate 21a having apertures 25 for receiving the threading means 24, and a pair of side plates 21b, 21b. One side plate 21b has an aperture 26a, an annular outward projection 26b around the aperture 26a and a center recess 26c defined inside the annular outward projection 26b. The other side plate 21b also has an aperture 27a, an annular outward projection 27b around the aperture 27a and a center recess 27c inside the annular outward projection 27b. In the embodiment shown in FIG. 3, the center recess 27c is larger than the center recess 26c, and the center recess 26c has a rotation-preventing means, which may be a polygonal side surface such as a hexagonal side surface.

A shaft 23 has a diameter-enlarged portion 23a at one end and a threaded portion 23b at the other end. In this embodiment, since the diameter-enlarged portion 23a has a complementary surface to that of the center recess 26c, the rotation of the shaft 23 is prevented by the engagement of the diameter-enlarged portion 23a and the center recess 26c.

The threaded portion 23b of the shaft 23 projects from the aperture 27a into the center recess 27c, and a nut 30 is threaded to the threaded portion 23b.

The roller 22 is rotatably supported by the shaft 23. In FIG. 3, lower ends of the two side plates 21b, 21b extend downward beyond the roller 22, so that the lower ends of the side plates 21b, 21b can prevent the flight 1 from derailing by their contact with the rails 15, 16.

In this embodiment, the U-shaped frame 21 is made of a glass fiber-reinforced polyacetal, because the annular outward projections 26b, 27b can be formed integrally with the U-shaped frame 21 by injection molding, and because the light weight of the glass fiber-reinforced polyacetal material reduces the overall weight of the flight. If the U-shaped frame 21 is made of stainless steel, the annular outward projections 26b, 27b would have to be produced separately and welded to the side plates 21b, 21b of the U-shaped frame 21, making the production process of the U-shaped frame 21 costly. Instead of the glass fiber-reinforced polyacetal, the U-shaped frame 21 may be produced from other fiber-reinforced plastics such as glass fiber-reinforced polyesters, glass fiber-reinforced nylons, etc. Incidentally, the roller 22 may be made of a urethane rubber, and the shaft 23 and the nut 30 may be made of stainless steel.

With respect to the flight 1, it has a substantially F-shaped cross section and is made of fiber-reinforced plastics as mentioned above. Accordingly, the flight 1 is light and shows high toughness during the operation. In addition, because the U-shaped frame 21 of the roller shoe is made of a light weight synthetic resin material, the flight 1 tends to sag less when supported only by spaced-apart roller.

Incidentally, in the case of a low-load roller shoe, the flight may be made of engineering plastics containing no glass fibers, such as polyacetals, polyesters, nylons, ultra-high-molecular-weight polyethylenes, etc.

As described above in detail, because of the above structure, the roller shoe can be made miniaturized, and the percentage of sludge remaining after sweeping can be reduced. In addition, the U-shaped frame is made of synthetic resins, the roller shoe can be made light, avoiding the deformation of the flight.

What is claimed is:

1. A roller shoe fixed to a flight for collecting sludge by sweeping, comprising:
   (a) a frame having a substantially U-shaped across section, which has a pair of side plates, one side plate being provided with a first aperture, a first annular outward projection around said first aperture and a first center recess inside said first annular outward projection, and the other side plate being provided with a second aperture, a second annular outward projection around said second aperture and a second center recess inside said second annular outward projection;
   (b) a shaft having a diameter-enlarged portion at one end and a threaded portion at the other end, said diameter-enlarged portion portion engaging said first center recess without projecting from said first annular outward projection such that the rotation of said shaft is prevented, and said threaded portion projecting from said second aperture and being fastened to a threading means inside said second center recess so that said shaft is fixed to said frame; and
   (c) a roller rotatably supportd by said shaft between the side plates,
wherein said frame is constituted by an injection-molded synthetic resin, and said roller is made of a synthetic resin.

2. A flight for collecting sludge by sweeping comprising a roller shoe fixed thereto, said roller shoe comprising:
   (a) a frame having a substantially U-shaped cross section, which has a pair of side plates, one side plate being provided with a first aperture, a first annular outward projection around said first aperture and a first center recess inside said first annular outward projection, and the other side plate being provided with a second aperture, a second annular outward projection around said second aperture and a second center recess inside said second annular outward projection;
   (b) a shaft having a diameter-enlarged portion at one end and a threaded portion at the other end, said diameter-enlarged portion engaging said first center recess without projecting from said first annular outward projection such that the rotation of said shaft is prevented, and said threaded portion projecting from said second aperture and being fastened to a threading means inside said second center recess so that said shaft is fixed to said frame; and (c) a roller rotatably supported by said shaft between the side plates, wherein said flight is made of fiber-reinforced plastics, said frame is constituted by an injection-molded synthetic resin, and said roller is made of a synthetic resin.

* * * * *

UNITED STATES PATENT AND TRADEMARK OFFICE
CERTIFICATE OF CORRECTION

PATENT NO. : 5,056,651

DATED : October 15, 1991

INVENTOR(S) : Hiromitsu Nagamatsu

It is certified that error appears in the above-identified patent and that said Letters Patent is hereby corrected as shown below:

```
Claim 1, col. 4, line 24, change "across" to --cross--;
                line 36, delete second occurrence of "portion";
                line 44, change "supportd" to --supported--.
```

Signed and Sealed this

Ninth Day of February, 1993

Attest:

STEPHEN G. KUNIN

*Attesting Officer*       Acting Commissioner of Patents and Trademarks